United States Patent
Ang et al.

(10) Patent No.: US 11,402,532 B2
(45) Date of Patent: Aug. 2, 2022

(54) LEAK LOCALIZATION USING ACOUSTIC-SIGNAL CORRELATIONS

(71) Applicant: Halliburton Energy Services, Inc., Houston, TX (US)

(72) Inventors: Yi Yang Ang, Singapore (SG); Yinghui Lu, The Woodlands, TX (US); Avinash Vinayak Taware, San Jose, CA (US); Srinivasan Jagannanthan, Houston, TX (US); Nam Nguyen, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 716 days.

(21) Appl. No.: 16/308,991

(22) PCT Filed: Jul. 12, 2016

(86) PCT No.: PCT/SG2016/050325
§ 371 (c)(1),
(2) Date: Dec. 11, 2018

(87) PCT Pub. No.: WO2018/013049
PCT Pub. Date: Jan. 18, 2018

(65) Prior Publication Data
US 2020/0309981 A1    Oct. 1, 2020

(51) Int. Cl.
*G01V 1/50*     (2006.01)
*E21B 47/107*   (2012.01)
(Continued)

(52) U.S. Cl.
CPC .............. *G01V 1/50* (2013.01); *E21B 47/04* (2013.01); *E21B 47/107* (2020.05); *G01V 1/46* (2013.01);
(Continued)

(58) Field of Classification Search
CPC .... G01V 1/50; G01V 1/46; G01V 2210/1214; G01V 2210/1299; G01V 2210/1429;
(Continued)

(56) References Cited

U.S. PATENT DOCUMENTS 4,114,721 A    9/1978  Glenn
4,881,207 A   11/1989  Dubesset et al.
(Continued)

FOREIGN PATENT DOCUMENTS

EP    1234101 B1 *  5/2003   ........... E21B 47/107
EP    1325358 B1    2/2009
(Continued)

OTHER PUBLICATIONS

EP Application Serial No. 16908969.5; Extended European Search Report; dated May 22, 2019, 9 pages.
(Continued)

*Primary Examiner* — Ian J Lobo
(74) *Attorney, Agent, or Firm* — Delizio, Peacock, Lewin & Guerra (57) ABSTRACT

Disclosed are acoustic logging systems and methods that involve correlating broadband acoustic signals acquired by a plurality of acoustic sensors at multiple depths within a wellbore to compute covariance matrices and their eigenvalues in the frequency domain for a plurality of frequency bins. In accordance with various embodiments, acoustic sources are detected and located based on the eigenvalues viewed as a function of depth and frequency.

17 Claims, 7 Drawing Sheets

(51) Int. Cl.
*E21B 47/04* (2012.01)
*G01V 1/46* (2006.01)

(52) U.S. Cl.
CPC ............ *G01V 2210/1214* (2013.01); *G01V 2210/1299* (2013.01); *G01V 2210/1429* (2013.01); *G01V 2210/43* (2013.01); *G01V 2210/65* (2013.01)

(58) Field of Classification Search
CPC .......... G01V 2210/43; G01V 2210/65; G01V 2210/123; E21B 47/107; E21B 47/04
See application file for complete search history.

(56) References Cited

U.S. PATENT DOCUMENTS 7,136,765 B2 * 11/2006 Maier .................. G01V 3/12
702/65
2003/0139884 A1   7/2003 Blanch et al.

FOREIGN PATENT DOCUMENTS

| GB | 2505131 B | 2/2014 |
| JP | 2006308563 A | 11/2006 |
| WO | 2004111388 A1 | 12/2004 |
| WO | 2014066611 A1 | 5/2014 |
| WO | 2016010553 A1 | 1/2016 |
| WO | 2016068979 A1 | 5/2016 |
| WO | 2016073003 A1 | 5/2016 |
| WO | 2016115012 A1 | 7/2016 |

OTHER PUBLICATIONS

PCT Application Serial No. PCT/SG2016/050325, International Search Report, dated Apr. 12, 2017, 3 pages.
PCT Application Serial No. PCT/SG2016/050325, International Written Opinion, dated Apr. 12, 2017, 12 pages.
EP Application No. 16908969.5, Communication pursuant to Article 94(3) EPC, dated Jun. 2, 2020, 7 pages.
Cigada, et al., "Moving microphone arrays to reduce spatial aliasing in the beamforming technique: Theoretical background and numerical investigation", J. Acoust. Soc. Am. 124 (6), 2008, 11 pages.

* cited by examiner

LEAK LOCALIZATION USING ACOUSTIC-SIGNAL CORRELATIONS

BACKGROUND

During the life cycle of an oil or gas well, it is desirable to monitor and maintain well integrity. In particular, the integrity of the well barriers (such as the production tubing, the well casing, and the surrounding cement sheath) is important to ensure safe operation of the well and avoid blow-out incidents or leakage of hydrocarbons to the environment. Leaks in the well barriers can in principle be detected based on underground fluid flows (e.g., of oil or gas) in and around a wellbore. Monitoring downhole flows around wellbores, such as injected water, can further be of interest in reservoir characterization. Underground flows generally emit acoustic signals that can be measured, e.g., with fiber cables disposed along the wellbore or with acoustic point sensors such as Fiber Bragg Grating (FBG) sensors or hydrophones. Existing methods are, however, very limited in the accuracy and precision with which they can localize (if at all) a detected flow.

DETAILED DESCRIPTION

Figure 1:
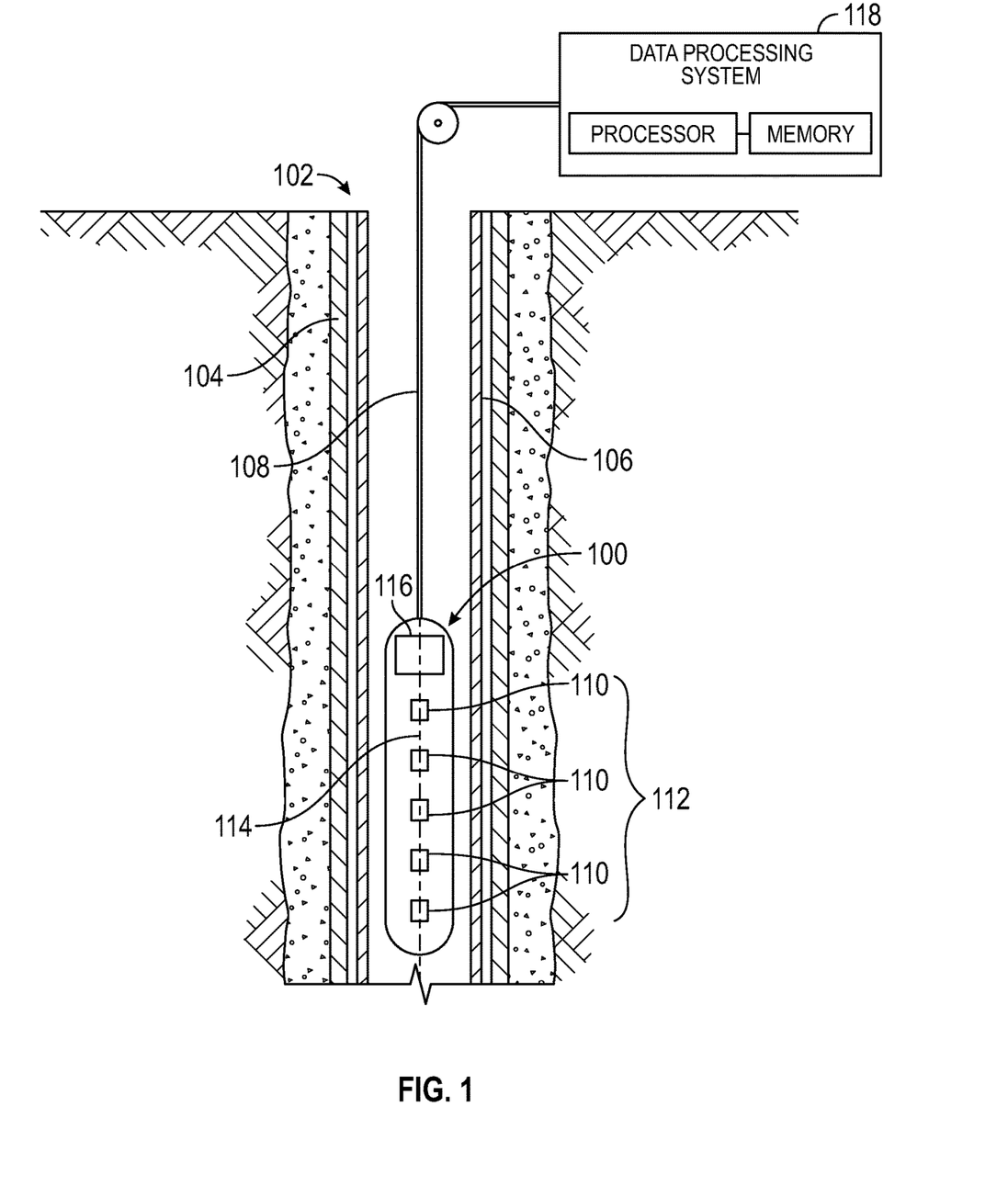
FIG. 1 is a schematic cross-sectional depiction of an example acoustic logging tool deployed within a cased wellbore in a wireline operation, in accordance with various embodiments.

The present disclosure relates generally to logging tools, systems, and methods for detecting one or more underground acoustic sources, and localizing them in depth along the wellbore, based on correlations between acoustic signals measured substantially simultaneously with a plurality of acoustic sensors disposed in the wellbore. The term "depth" herein generally refers to a coordinate along the direction of the longitudinal axis of a wellbore, regardless whether the wellbore extends vertically into the formation (e.g., as shown in FIG. 1) or is tilted with respect to the vertical direction. "Substantially simultaneously" herein indicates that the time intervals over which signals are collected overlap significantly (e.g., by at least 90%, preferably at least 99%) between the different sensors.

In accordance with various embodiments, an acoustic logging tool moving through the wellbore acquires, during each of multiple measurement cycles corresponding to different depths of the tool within the wellbore, broadband acoustic signals with a plurality of sensors of the tool (which may be, e.g., arranged in an array). For a given depth, the acquired broadband signals of the various sensors are correlated in the frequency domain (e.g., following a Fourier transform) by computing covariance matrices from the acoustic signals for each of a plurality of frequency bins within a frequency range covered by the broadband signals. Based on eigenvalues of these covariance matrices, viewed as a function of frequency and depth, the depth of one or more acoustic sources can then be determined.

The foregoing will be more readily understood from the following description of various example embodiments and the accompanying drawings.

FIG. 1 is a schematic cross-sectional depiction of an example acoustic logging tool 100 deployed within a cased wellbore 102 in a wireline operation, in accordance with various embodiments. As shown, the wellbore 102 is completed with a casing string 104 cemented in place; more generally, the wellbore 102 may include one or multiple nested casing strings. Also shown is production tubing 106, through which hydrocarbons may be pumped out of the wellbore 102. The acoustic logging tool 100 is disposed interior to the production tubing 106, suspended from a wireline 108 as part of a wireline logging system. The tool 100 includes a plurality of acoustic sensors 110 (such as, e.g., hydrophones), e.g., arranged in a linear array 112 along a longitudinal axis 114 of the tool 100 and, thus, of the wellbore 102. The tool 100 further includes suitable control and processing circuitry 116, which may, in turn, be in communication (e.g., via a wired connection or a telemetry system) with a surface data-processing system 118 (e.g., implemented by a general-purpose computer including one or more processors and associated memory). The control and processing circuitry 116 can operate the sensor array 112 to repeatedly (e.g., continuously or at certain intervals) acquire acoustic measurements as the logging tool 100 moves through the wellbore 102. The signals acquired during each measurement cycle can be processed to detect any acoustic source at the depth where the signals were measured (that is, in the vicinity of the acoustic sensor-array 112 at the time of the measurement). Thus, within one pass of wireline logging, a region spanning the entire length of the wellbore 102 can be searched for acoustic sources. Acoustic-source detection and localization in accordance herewith may be employed, in particular, to find underground fluid flows (e.g., resulting from leaks in the well barriers, as described below with reference to FIG. 2) from which the acoustic signals emanate. In some embodiments, the acoustic sensor array 112 is operated in a fast logging speed (e.g., at as much as 60 feet per minute) to detect flows initially with coarse spatial resolution. Once one or more flows have been detected at certain depths, regions at those depths can be re-logged at a slower logging speed, or in stationary mode, to localize the flow(s) at a finer spatial resolution.

The computational functionality for processing the acoustic signals received by the individual sensors 110 and detecting and localizing flows based thereon may be implemented by either one of the control and processing circuitry 116 integrated into the tool 100 or the data-processing system 118 that is located at the surface, or by both in combination. For example, in some embodiments, the control and processing circuitry 116 pre-processes the individual sensor signals (e.g., through signal conditioning, filtering, and/or noise cancellation) and transmits them to the surface data-processing system 118, where the covariance matrices and eigenvalues are computed, and flow-induced acoustic sources are detected and localized based thereon. Each of the control and processing circuitry 116 and the surface data-processing system 118 may generally be implemented in hardware, software, or a combination thereof, such as with special-purpose circuitry (e.g., a digital signal processor, field-programmable gate-array, etc.) or a suitably programmed general-purpose computer including, e.g., a processor and associated memory (as shown in FIG. 1). In various embodiments, the processed acoustic signals may be evaluated in conjunction with measurements from other sensors (e.g., temperature and surface well-pressure measurements) to evaluate flow conditions and overall well integrity.

Alternatively to being conveyed downhole on a wireline, as described above, the acoustic logging tool 100 can be deployed using other types of conveyance, as will be readily appreciated by those of ordinary skill in the art. For example, the tool 100 may be lowered into the wellbore 102 by slickline (a solid mechanical wire that generally does not enable power and signal transmission), and may include a battery or other independent power supply as well as memory to store the measurements until the tool 100 has been brought back up to the surface and the data retrieved. Alternative means of conveyance include, for example, coiled tubing, downhole tractor, or drill pipe (e.g., used as part of a tool string within or near a bottom-hole-assembly during logging/measurement-while-drilling operations). Acoustic-source detection and localization during drilling may be useful, e.g., to detect flows for the purpose of characterizing the formation and hydrocarbon reservoirs, and steer or otherwise adjust drilling based thereon.

Figure 2:
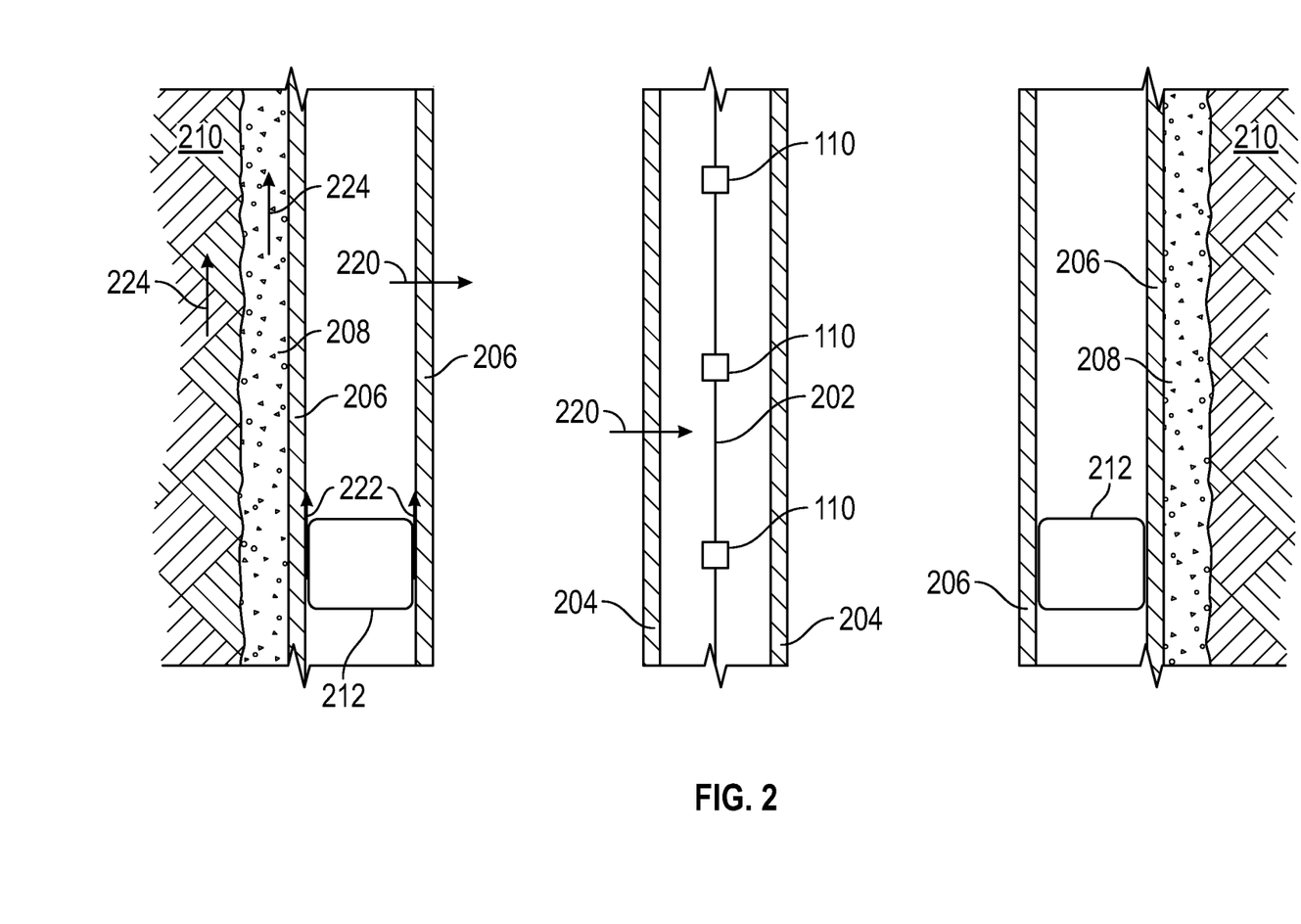
FIG. 2 is a schematic cross-sectional depiction of an example acoustic-sensor array deployed within a cased wellbore, illustrating different kinds of leaks detectable in accordance with various embodiments.

Returning to the application of acoustic-source detection for the purpose of assessing the integrity of the well barriers, FIG. 2 is a schematic cross-sectional depiction of an example acoustic-sensor array deployed within a cased wellbore (e.g. wellbore 102 of FIG. 1), illustrating different kinds of leaks detectable, an localizable in depth, in accordance with various embodiments. As shown, the sensors 110 may be arranged linearly along the longitudinal axis 202 of the wellbore (whose radial coordinate is zero). They may be uniformly spaced (as shown), or have varying spacings between adjacent sensors 110. The sensor environment generally includes multiple physical barriers to fluid flow, such as the production tubing 204 through which oil or gas may be pumped up and out of the well, one or optionally multiple nested well casings 206, and a cement sheath 208 filling the space between the casing(s) 206 and the formation 210 surrounding the wellbore. Additionally, the wellbore may be divided into multiple vertical and/or horizontal sections, e.g., by packers 212 between the casings 206 that may separate, e.g., a lower, perforated portion of the tubing where hydrocarbons enter from an upper (non-perforated) portion serving as an upward conduit. Unintended flow scenarios that can occur in such a configuration include, e.g., flows across the casing 206 or tubing 204 due to cracks or holes therein (indicated by arrows 220), flows past a packer 212 between adjacent wellbore sections due to insufficient sealing (indicated by arrows 222), and flows within the formation 210, cement sheath 208, or other layer more or less parallel to the layer boundaries (indicated by arrows 224). As these flows pass through restricted paths, acoustic signals can be generated as a result of the accompanying pressure drops. The acoustic signals propagate generally in all direction through the formation and/or wellbore, eventually being detected at the various sensor locations.

Various conventional leak-scanning methods use the power spectral density of a single acoustic sensor to estimate the depth of acoustic sources.

Figure 3:
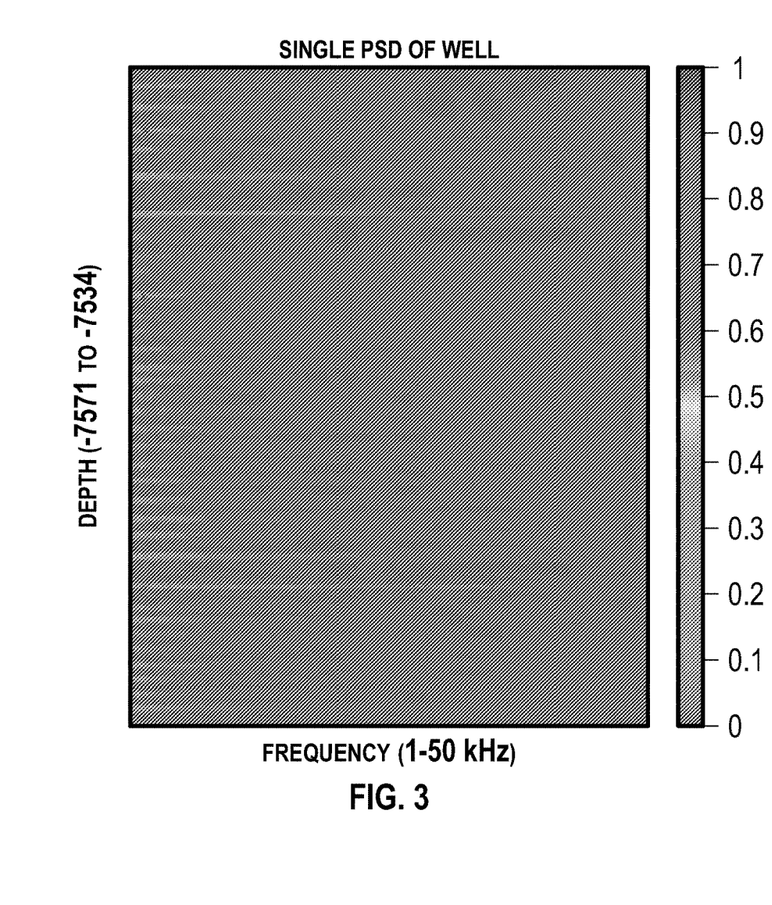
FIG. 3 is a two-dimensional map of the power spectral density of broadband acoustic signals obtained from a single acoustic sensor, as a function of depth and frequency.

FIG. 3 is a two-dimensional map of the power spectral density of broadband acoustic signals obtained from a single acoustic sensor as a function of depth and frequency (covering a range from 1 kHz to 50 kHz), as derived from a portion of an acoustic log acquired in a wellbore. As can be seen, the power spectral density peaks, particularly at low frequencies, at multiple depths throughout the depicted portion. Some of these high-spectral-density regions may correspond to acoustic sources, but not all do. The sensor may, for example, pick up echo, moving noise of the sensor, and the reverberation of the entire tool as it traverses the wellbore.

Figure 4:
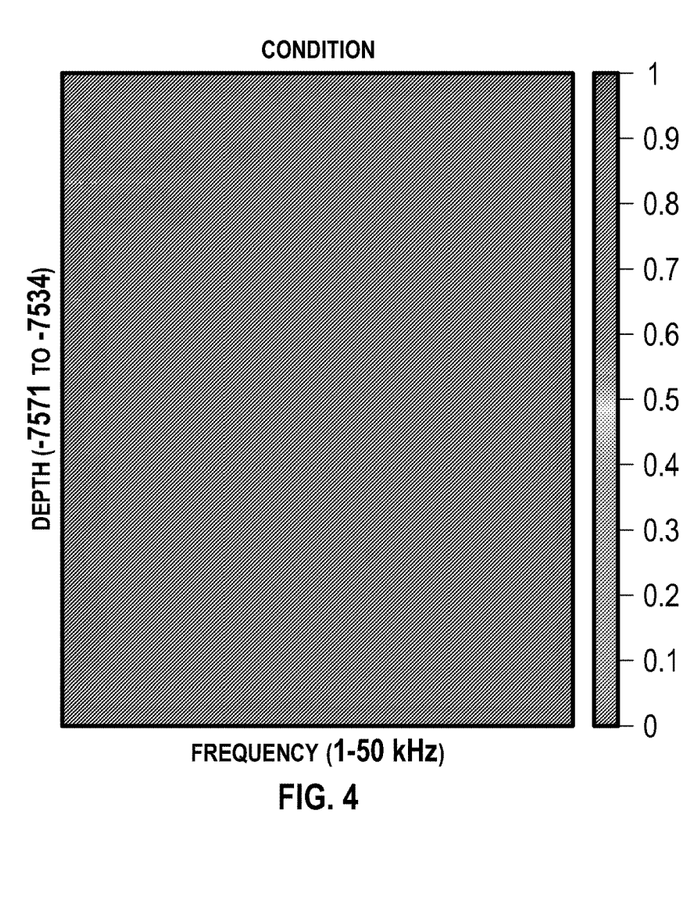
FIG. 4 is a two-dimensional map of the condition number, as a function of depth and frequency, of the covariance matrices computed from acoustic signals acquired by an array of multiple acoustic sensors, in accordance with various embodiments.

For comparison, FIG. 4 shows a map of the condition number (i.e., the ratio of the maximum and minimum eigenvalues), as a function of depth and frequency, of the covariance matrices computed from acoustic signals acquired by a sensor array (in the same log as underlies FIG. 3), in accordance with various embodiments. The condition number captures the correlation between the signals acquired by different sensors, which is strong for signals from an acoustic source, whereas noise picked up by the individual sensors is generally uncorrelated (and thus not amplified). Therefore, by contrast to the power spectral density of FIG. 3, the condition number depicted in FIG. 4 exhibits a clear maximum at only one depth (where FIG. 3 likewise shows a peak), corresponding to the location of a leak-induced acoustic source. Accordingly, in various embodiments, the detection and localization of leak-induced acoustic sources is enhanced, compared with conventional single-sensor power-spectral-density approaches, by correlating acoustic signals from an array of sensors and extracting meaningful information from the eigenvalues of the resulting covariance matrices.

Figure 5:
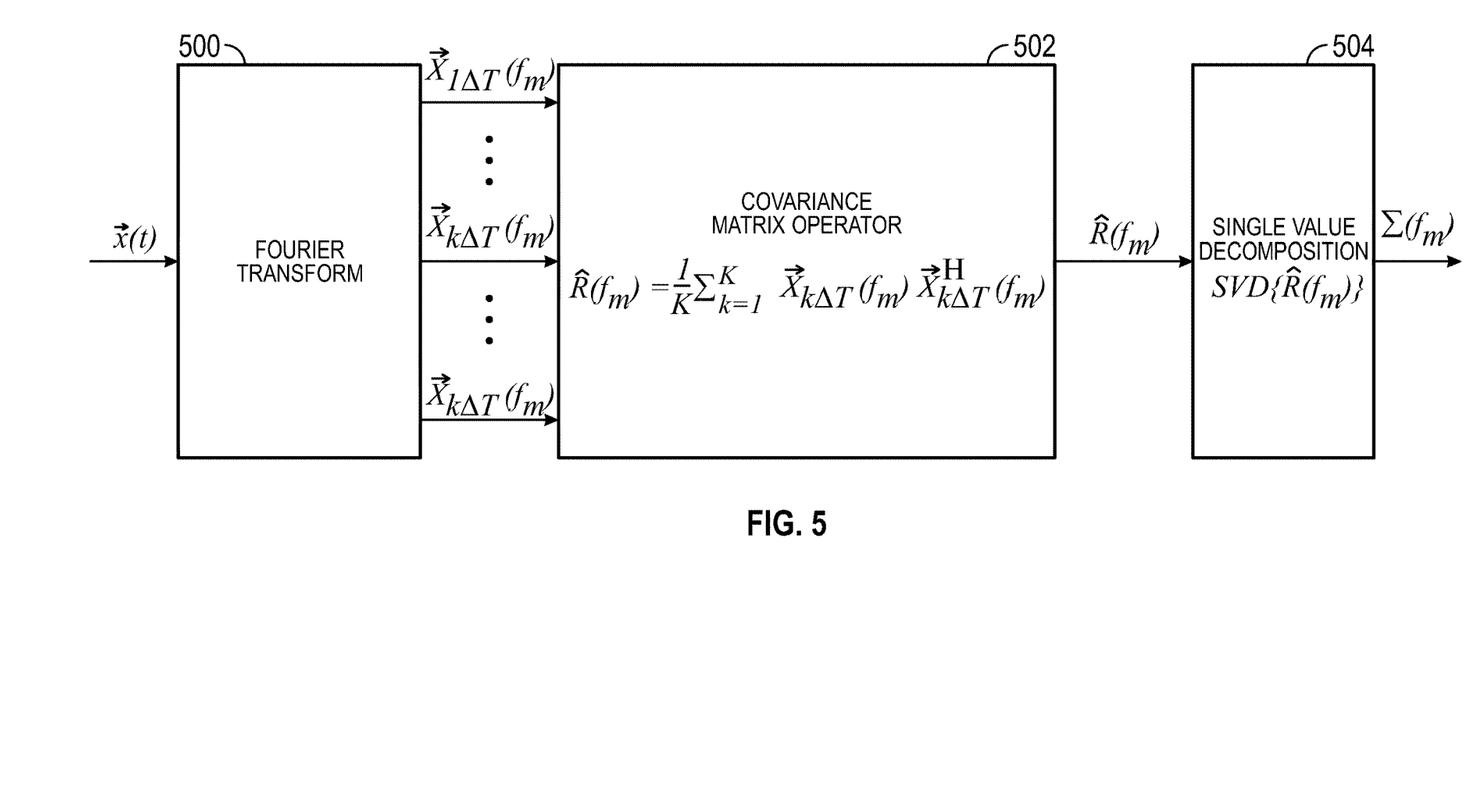
FIG. 5 is a schematic diagram of an example method for computing eigenvalues of covariance matrices correlating broad-band acoustic signals acquired with multiple acoustic sensors, in accordance with various embodiments.

FIG. 5 is a schematic diagram of an example method for computing eigenvalues of covariance matrices correlating broad-band acoustic signals acquired with multiple acoustic sensors, in accordance with various embodiments. The time-domain acoustic signals $x_i(t)$, i=1 ... N, measured substantially simultaneously by N acoustic sensors (collective expressed as a vector $\vec{x}(t)$) serve as input to the method. These time-domain signals are converted, by Fourier transform 500, into respective spectra $X_i(f)$ (collectively expressed as a vector $\vec{X}(f)$). The total spectral range may be divided into multiple frequency bins; the spectral portions for the frequency bin at $f=f_m$ are herein denoted by $X(m=1 ... M)$. For the purpose of statistical stability, the total observation interval T associated with each measurement cycle is, in some embodiments, divided into a plurality of K disjoint intervals of length $\Delta T$. Then, a window Fourier transform is performed on the disjoint intervals to generate the corresponding K sets of Fourier-transformed signals for each frequency bin $f_m$:

$$\{\vec{X}_{1\Delta T}(f_m), \ldots, \vec{X}_{k\Delta T}(f_m), \ldots \vec{X}_{K\Delta T}(f_m)\}.$$

These Fourier-transformed signals are passed through a covariance matrix operator 502 to compute, for each of the M frequency bins, a corresponding covariance matrix $\hat{R}(f_m)$, summing over the K disjoint intervals:

$$\hat{R}(f_m) = \frac{1}{K}\sum_{k=1}^{K} \vec{X}_{k\Delta T}(f_m)\vec{X}_{k\Delta T}^{H}(f_m),$$

where H indicates the conjugate transpose (i.e., the Hermitian). A singular-value-decomposition operator 504 is then applied to the covariance matrix $\hat{R}(f_m)$ of each frequency bin to compute the eigenvalues $\Sigma(f_m)$ of the matrix $\hat{R}(f_m)$. Candidates for eigenvalues suitable to detect and localize acoustic source include, for example and without limitation, individual eigenvalues such as the maximum (or "first") eigenvalue, as well as eigenvalue rations such as the ratio of the maximum eigenvalue to the minimum eigenvalue (also known as the "condition number") or the ratio of the first eigenvalue to the second eigenvalue (also known as the "eigenratio").

Figure 6A:
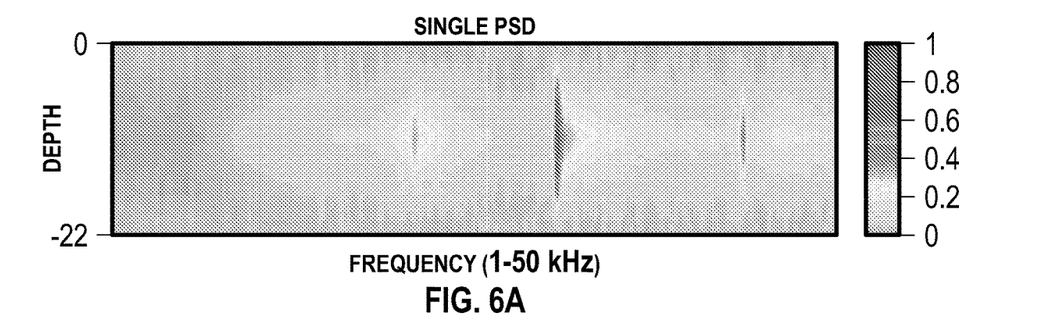
FIGS. 6A-6D illustrate depth frequency maps of the single-sensor power spectral density, maximum eigenvalue, condition number, and eigenratio, respectively, computed from simulated leak-induced acoustic signals, illustrating enhanced leak-scanning in accordance with various embodiments.
Figure 6B:
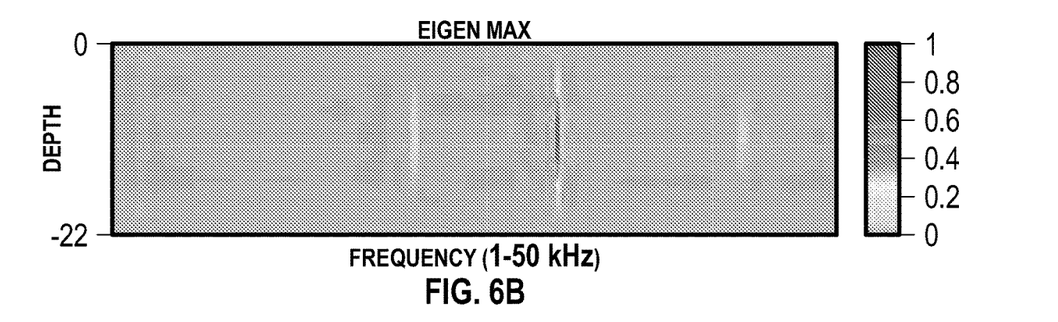
Figure 6C:
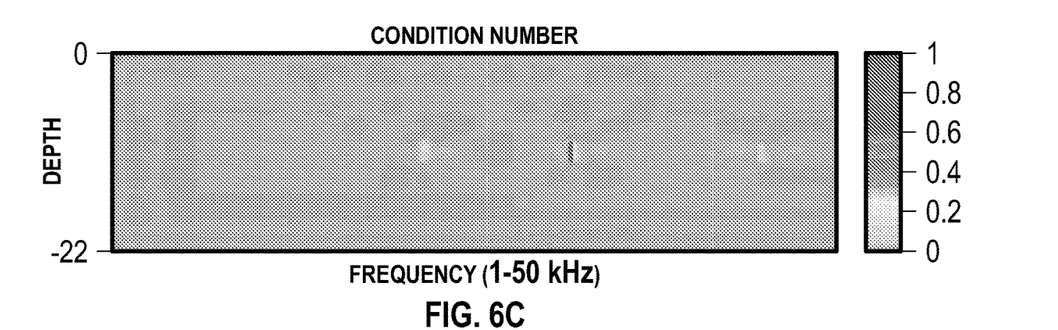
Figure 6D:
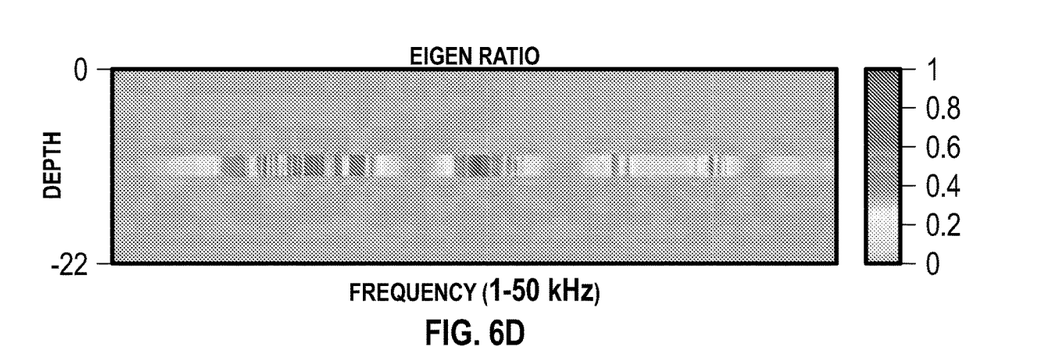

FIGS. 6A-6D illustrate depth frequency maps of the single-sensor power spectral density, maximum eigenvalue, condition number, and eigenratio, respectively, computed from simulated leak-induced acoustic signals, illustrating enhanced leak-scanning in accordance with various embodiments. As can be seen in FIG. 6A, the single-sensor power spectral density exhibits local maxima, at three discrete frequencies, that extend across a significant depth range of almost 20 inches, limiting the accuracy or spatial resolution with which the corresponding acoustic source can be localized in depth. Similarly, FIG. 6B shows the maximum eigenvalue of the covariance matrix peaking across a range of depths at the same three frequencies as the power spectral density. As illustrated in FIGS. 6C and 6D, by contrast, both the condition number and the eigenratio reach local maxima in a much narrower band of depths. In the case of the condition number (FIG. 6C), these local maxima appear at the same frequencies where the maximum eigenvalue and power spectral density peaks, whereas the eigenratio (FIG. 6D) is significantly larger in the narrow depth band than at other depths across a wide range of frequencies. As FIGS. 6C and 6D show, the condition number and eigenratio both provide a good signal for improving the depth localization of the acoustic source, relative to that achieved using the power spectral density, for the simulated example.

Figure 7:
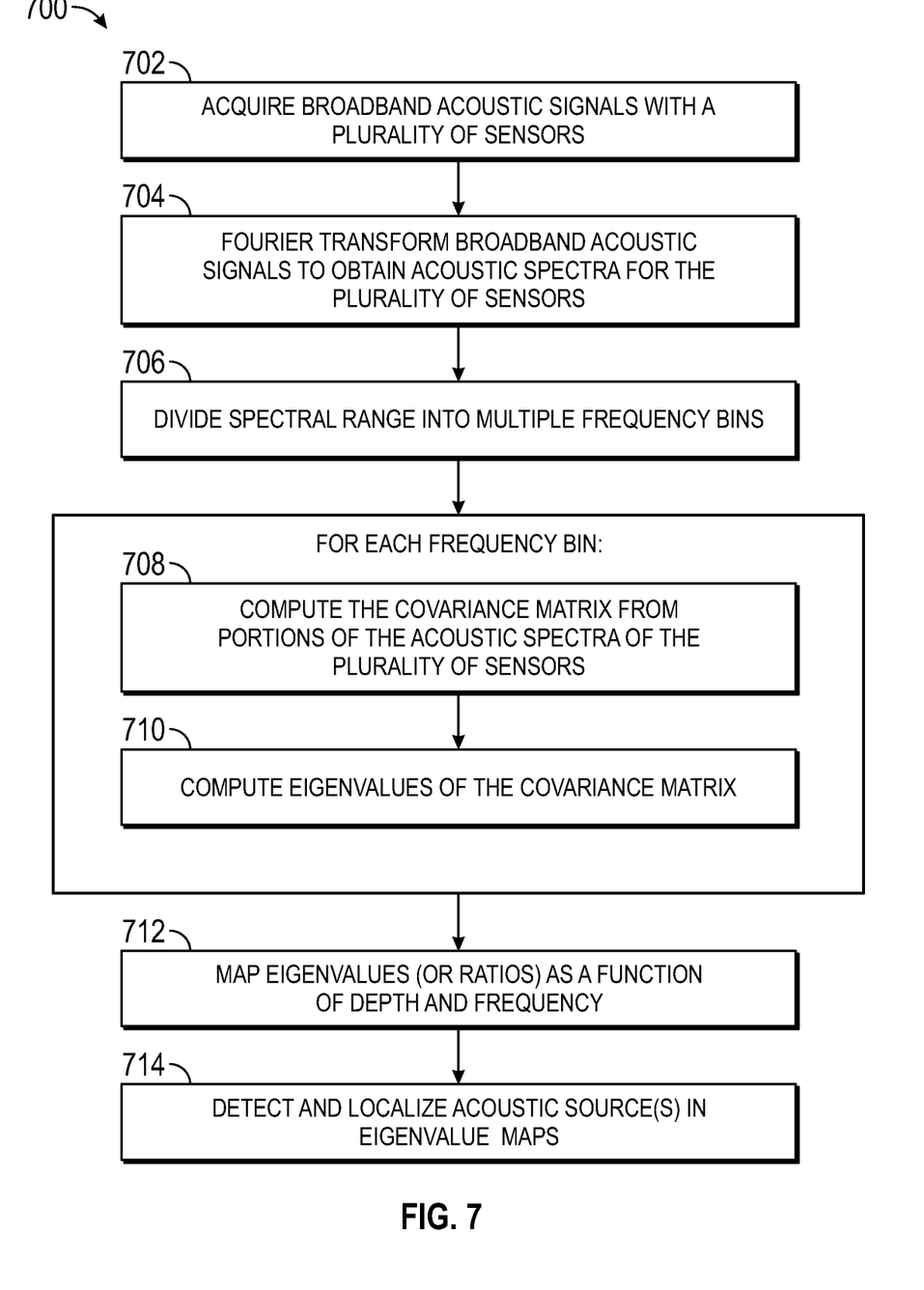
FIG. 7 is a flow chart of a method 700 for detecting and determining the depth of acoustic sources based on eigenvalues of the covariance matrices correlating broad-band acoustic signals acquired with multiple acoustic sensors, in accordance with various embodiments.

FIG. 7 is a flow chart of a method 700 for detecting and determining the depth of acoustic sources based on eigenvalues of the covariance matrices correlating broad-band acoustic signals acquired with multiple acoustic sensors, in accordance with various embodiments. The method 700 involves acquiring time-domain broadband acoustic signals with a plurality of sensors (act 702). The sensors may, for instance, form an acoustic sensor array of an acoustic logging tool 100 disposed in a wellbore, e.g., for the purpose of detecting leaks in the well barriers. The broadband acoustic signals are converted, by Fourier transform (e.g., if implemented on a computer, by fast Fourier transform or some other discrete Fourier transform algorithm) into acoustic spectra for the plurality of sensors (act 704), and the spectral range covered by the acoustic spectra is divided into multiple frequency bins (act 706). For each frequency bin, the respective portions of the spectra for the plurality of sensors are processed together to compute a covariance matrix for the frequency bin (act 708). As described above with respect to FIG. 5, in some embodiments, the time-domain signals are divided into multiple intervals, and a window Fourier transform is applied for the individual intervals (in act 704), followed by computation of individual covariance matrices, which may thereafter by averaged over the intervals to obtain an overall covariance matrix for the frequency bin. The eigenvalues of the covariance matrix $\hat{R}(f_m)$ of each frequency bin can then be computed (act 710) using methods well-known to those of ordinary skill in the art, such as, e.g., singular value decomposition. Selected eigenvalues or combinations thereof, e.g., eigenvalue ratios such as the eigenratio or condition number, are then aggregated across frequency bins and depths to create a two-dimensional map of eigenvalues (act 712). From this map, the existence and location in depth of one or more acoustic source(s) can then be inferred (act 714) based on local maxima. The choice of the eigenvalue or combination (ratio or other) of eigenvalues (or most generally, the selected function of eigenvalues) used to localize the acoustic source may be made based on, e.g., the wellbore configuration (such as number and size of pipes, borehole fluids and formation properties) and types of anticipated leaks or other acoustic sources. For example, while data for liquid leaks suggest that the eigenratio and condition number are particularly suitable, sand or air leaks may call for the use of different types of eigenvalues or ratios thereof.

Figure 8:
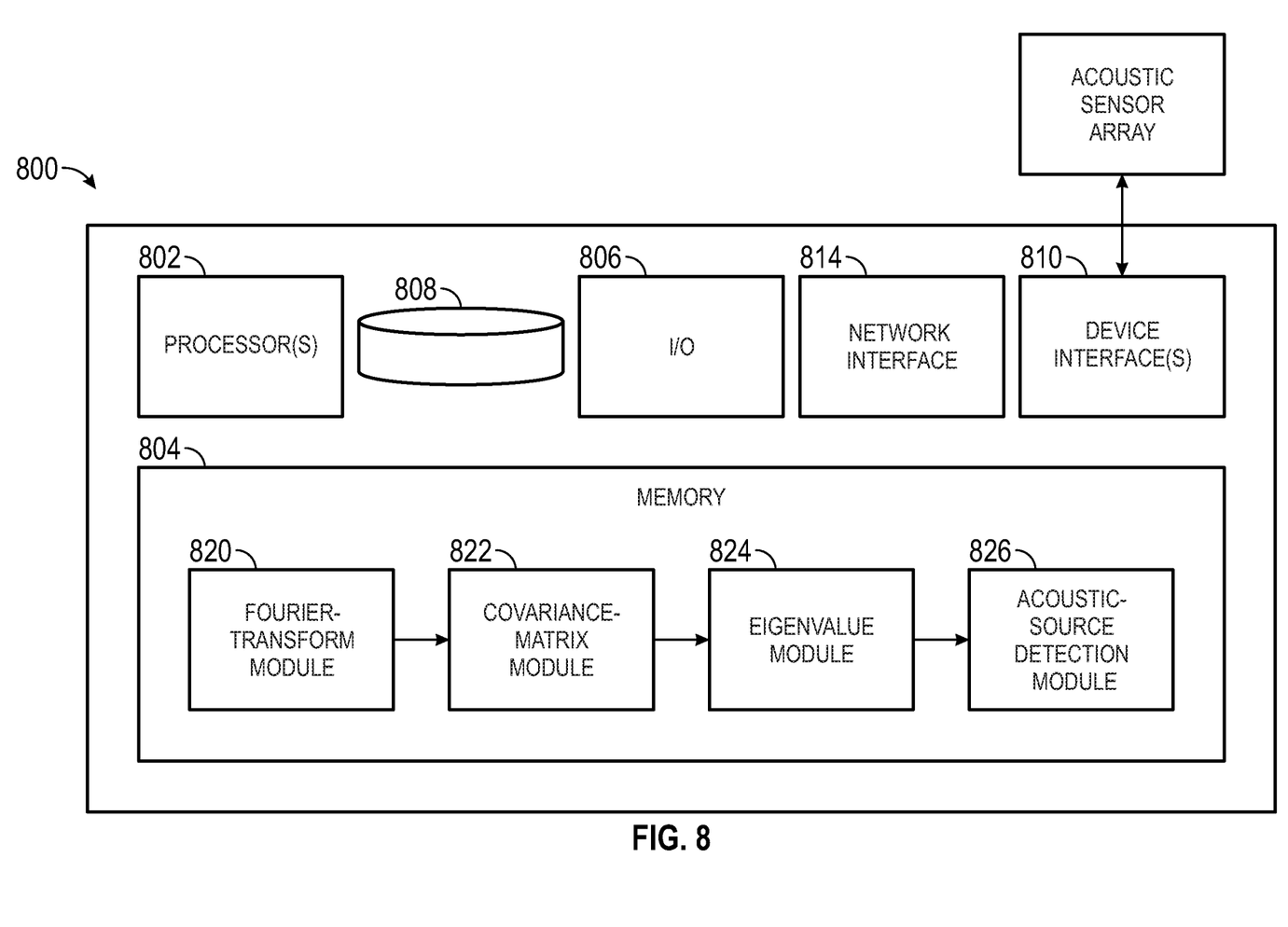
FIG. 8 is a block diagram of an example data-processing facility for implementing the computational functionality of the method of FIG. 7, in accordance with various embodiments.

FIG. 8 is a block diagram of an example data-processing facility 800 in the form of a suitably programmed general-purpose computer (e.g., any one or more elements of which may be implemented by the control and processing circuitry 116, the surface data-processing system 118, or a combination of the two) for implementing the computational functionality of the method of FIG. 7, in accordance with various embodiments. Various elements of the example data-processing facility 800 will now be described.

The data-processing facility 800 includes one or more processors 802 (e.g., a conventional central processing unit (CPU), graphical processing unit, or other) configured to execute software programs stored in memory 804 (which may be, e.g., random-access memory (RAM), read-only memory (ROM), flash memory, etc.). Further, the data-processing facility 800 may include user input/output devices 806 (e.g., a screen, keyboard, mouse, etc.), permanent-data-storage devices 808 (including, e.g., solid-state, optical, and/or magnetic machine-readable media such as hard disks, CD-ROMs, DVD-ROMs, etc.), device interfaces 810 for communicating directly or indirectly with the acoustic sensor array (e.g., array 112), a network interface 814 that facilitates communication with other computer systems and/or data repositories, and a system bus (not shown) through which the other components communicate. While shown as a single unit, the data-processing facility 800 may also be distributed over multiple machines connected to each other via a wired or wireless network such as a local network or the Internet.

The software programs stored in the memory 804 (and/or in permanent-data-storage devices 808) include processor-executable instructions for performing the methods described herein, and may be implemented in any of various programming languages, for example and without limitation, C, C++, Object C, Pascal, Basic, Fortran, Matlab, and Python. The instructions may be grouped in various functional modules, e.g., for the purpose of re-use and sharing of the functionality of certain modules between other modules that utilize it. In accordance with the depicted embodiment, the modules include, for instance, a Fourier transform module 820 configured to convert time-domain signals acquired by the acoustic sensors into spectra (e.g., implementing a fast Fourier transform algorithm); a covariance matrix module 822 configured to compute covariance matrices for multiple respective frequency bins from the spectra; an eigenvalue module 824 configured to compute the eigenvalues of the covariance matrices (e.g., implementing a singular-value-decomposition algorithm); and an acoustic-source detection module 826 configured to map selected eigenvalues or ratios thereof as a function of depth and frequency and identify one or more local maxima indicative of acoustic sources the in eigenvalue maps and determine their locations.

Of course, the depicted organization into modules is merely one non-limiting example of ways in which instructions that implement the disclosed functionality can be grouped. Further, the various computational modules depicted in FIG. 8 need not all be part of the same software program or even stored on the same machine. Rather, certain groups of modules can operate independently of the others and provide data output that can be stored and subsequently provided as input to other modules. Further, as will be readily appreciated by those of ordinary skill in the art, software programs implementing the methods described herein (e.g., organized into functional modules as depicted in FIG. 8) may be stored, separately from any data-processing facility, in one or more tangible, non-volatile machine-readable media (such as, without limitation, solid-state, optical, or magnetic storage media), from which they may be loaded into (volatile) system memory of a data-processing facility for execution. In addition, software programs may be communicated on suitable carrier media (tangible or non-tangible), such as signals transmitted over a network.

In general, the data-processing facility carrying out the computational functionality described herein (optionally as organized into various functional modules) can be implemented with any suitable combination of hardware, firmware, and/or software. For example, the data-processing facility may be permanently configured (e.g., with hard-wired circuitry) or temporarily configured (e.g., programmed), or both in part, to implement the described functionality. A tangible entity configured, whether permanently and/or temporarily, to operate in a certain manner or to perform certain operations described herein, is herein termed a "hardware-implemented module" or "hardware module," and a hardware module using one or more processors is termed a "processor-implemented module." Hardware modules may include, for example, dedicated circuitry or logic that is permanently configured to perform certain operations, such as a field-programmable gate array (FPGA), application-specific integrated circuit (ASIC), or other special-purpose processor. A hardware module may also include programmable logic or circuitry, such as a general-purpose processor, that is temporarily configured by software to perform certain operations. Considering example embodiments in which hardware modules are temporarily configured, the hardware modules collectively implementing the described functionality need not all co-exist at the same time, but may be configured or instantiated at different times. For example, where a hardware module comprises a general-purpose processor configured by software to implement a special-purpose module, the general-purpose processor may be configured for respectively different special-purpose modules at different times.

The following numbered examples are illustrative embodiments:

1. A method, comprising: for a plurality of depths along a wellbore,
using an acoustic logging tool disposed in the wellbore at the respective depth to acquire broadband acoustic signals with an array of sensors; correlating the acoustic signals acquired by the sensors in the frequency domain by computing covariance matrices from the acoustic signals for each of a plurality of frequency bins within a frequency range covered by the broadband acoustic signals; computing eigenvalues of the covariance matrices; and determining a depth along the wellbore of an acoustic source based on the eigenvalues computed for the plurality of frequency bins and the plurality of depths.

2. The method of example 1, wherein the depth of the acoustic source is determined based on ratios of eigenvalues computed for the plurality of frequency bins and the plurality of depths.

3. The method of example 2, wherein the ratios of eigenvalues are condition numbers.

4. The method of example 2, wherein the ratios of eigenvalues are eigenratios.

5. The method of example 1, wherein the depth of the acoustic source is determined based on maximum eigenvalues computed for the plurality of frequency bins and the plurality of depths.

6. The method of any one of the preceding examples, further comprising Fourier-transforming the acquired broadband acoustic signals, the covariance matrices being computed from signal values of the Fourier-transformed signals in the plurality of frequency bins.

7. The method of example 6, further comprising dividing a total measurement interval associated with the acquired acoustic signals into a plurality of disjoint sub-intervals, wherein Fourier-transforming the acquired acoustic signals comprises applying a window Fourier transform to signal portions within each of the sub-intervals and computing the covariance matrices comprises summing over the sub-intervals.

8. The method of any one of examples 1-7, wherein the depth along the wellbore of the acoustic source is determined from a maximum of a function of the eigenvalues in their dependence on depth.

9. A system, comprising: an acoustic logging tool comprising an array of acoustic sensors, configured to acquire broadband acoustic signals covering an associated frequency range; and a data-processing facility for processing the broadband acoustic signals acquired by the acoustic sensors at a plurality of depths along a wellbore, the processing facility configured to: for each of the plurality of depths, correlate the acoustic signals acquired by the sensors in the frequency domain by computing covariance matrices from the acoustic signals for each of a plurality of frequency bins within the frequency range, and compute eigenvalues of the covariance matrices; and determine a depth along the wellbore of an acoustic source based on the eigenvalues computed for the plurality of frequency bins and the plurality of depths.

10. The system of example 9, wherein the data-processing facility is configured to determine the depth of the acoustic source based on ratios of eigenvalues computed for the plurality of frequency bins and the plurality of depths.

11. The system of example 10, wherein the ratios of eigenvalues are condition numbers.

12. The system of example 10, wherein the ratios of eigenvalues are eigenratios.

13. The system of example 9, wherein the data-processing facility is configured determine the depth of the acoustic source based on maximum eigenvalues computed for the plurality of frequency bins and the plurality of depths.

14. The system of any one of examples 9-13, wherein the data-processing facility is configured to Fourier-transform the acquired broadband acoustic signals, the covariance matrices being computed from signal values of the Fourier-transformed signals in the plurality of frequency bins.

15. The system of example 14, wherein the data-processing facility is configured to further divide a total measurement interval associated with the acquired acoustic signals into a plurality of disjoint sub-intervals, Fourier-transform the acquired acoustic signals by applying a window Fourier transform to signal portions within each of the sub-intervals, and sum over the sub-intervals in computing the covariance matrices.

16. A tangible machine-readable medium storing processor-executable instructions for processing broadband acoustic signals acquired by a plurality of acoustic sensors, the instructions configured to control the operation of one or more processors to: for each of the plurality of depths, correlate the acoustic signals acquired by the sensors in the frequency domain by computing covariance matrices from the acoustic signals for each of a plurality of frequency bins within the frequency range, and compute eigenvalues of the covariance matrices; and determine a depth along the wellbore of an acoustic source based on the eigenvalues computed for the plurality of frequency bins and the plurality of depths.

17. The machine-readable medium of example 16, wherein the instructions are configured to control the operation of the one or more processors to determine the depth of the acoustic source based on ratios of eigenvalues computed for the plurality of frequency bins and the plurality of depths.

18. The machine-readable medium of example 17, wherein the ratios of eigenvalues are condition numbers.

19. The machine-readable medium of example 17, wherein the ratios of eigenvalues are eigenratios.

20. The machine-readable medium of any one of examples 16-19, wherein the instructions are configured to control the operation of the one or more processors to Fourier-transform the acquired broadband acoustic signals, the covariance matrices being computed from signal values of the Fourier-transformed signals in the plurality of frequency bins.

Many variations may be made in the systems, tools, and methods described and illustrated herein without departing from the scope of the inventive subject matter. Accordingly, the scope of the inventive subject matter is to be determined by the scope of the following claims and all additional claims supported by the present disclosure, and all equivalents of such claims.

What is claimed is:

1. A method, comprising:
for a plurality of depths along a wellbore,
using an acoustic logging tool disposed in the wellbore at the respective depth to acquire broadband acoustic signals with an array of sensors;
correlating the broadband acoustic signals acquired by the sensors in the frequency domain by computing covariance matrices from the broadband acoustic signals for each of a plurality of frequency bins within a frequency range covered by the broadband acoustic signals;
computing eigenvalues of the covariance matrices; and
determining a depth along the wellbore of an acoustic source based on ratios of the eigenvalues computed for the plurality of frequency bins and the plurality of depths.

2. The method of claim 1, wherein the ratios of eigenvalues are condition numbers.

3. The method of claim 1, wherein the ratios of eigenvalues are eigenratios.

4. The method of claim 1, wherein the depth of the acoustic source is determined based on maximum eigenvalues computed for the plurality of frequency bins and the plurality of depths.

5. The method of claim 1, further comprising Fourier-transforming the acquired broadband acoustic signals, the covariance matrices being computed from signal values of the Fourier-transformed signals in the plurality of frequency bins.

6. The method of claim 5, further comprising dividing a total measurement interval associated with the acquired broadband acoustic signals into a plurality of disjoint sub-intervals, wherein Fourier-transforming the acquired acoustic signals comprises applying a window Fourier transform to signal portions within each of the disjoint sub-intervals and computing the covariance matrices comprises summing over the sub-intervals.

7. The method of claim 1, wherein the depth along the wellbore of the acoustic source is determined from a maximum of a function of the eigenvalues in their dependence on depth.

8. A system, comprising:
an acoustic logging tool comprising an array of acoustic sensors configured to acquire broadband acoustic signals covering an associated frequency range; and
a data-processing facility for processing the broadband acoustic signals acquired by the acoustic sensors at a plurality of depths along a wellbore, the processing facility configured to:
for each of the plurality of depths,
correlate the broadband acoustic signals acquired by the sensors in the frequency domain by computing covariance matrices from the broadband acoustic signals for each of a plurality of frequency bins within the frequency range, and
compute eigenvalues of the covariance matrices; and
determine a depth along the wellbore of an acoustic source based on ratios of eigenvalues computed for the plurality of frequency bins and the plurality of depths.

9. The system of claim 8, wherein the ratios of eigenvalues are condition numbers.

10. The system of claim 8, wherein the ratios of eigenvalues are eigenratios.

11. The system of claim 8, wherein the data-processing facility is configured determine the depth of the acoustic source based on maximum eigenvalues computed for the plurality of frequency bins and the plurality of depths.

12. The system of claim 8, wherein the data-processing facility is configured to Fourier-transform the acquired broadband acoustic signals, the covariance matrices being computed from signal values of the Fourier-transformed signals in the plurality of frequency bins.

13. The system of claim 12, wherein the data-processing facility is configured to further divide a total measurement interval associated with the acquired broadband acoustic signals into a plurality of disjoint sub-intervals, Fourier-transform the acquired acoustic signals by applying a window Fourier transform to signal portions within each of the disjoint sub-intervals, and sum over the sub-intervals in computing the covariance matrices.

14. A tangible machine-readable medium storing processor-executable instructions for processing broadband acoustic signals acquired by a plurality of acoustic sensors, the instructions configured to control the operation of one or more processors to:
   for each of a plurality of depths,
      correlate the broadband acoustic signals acquired by the sensors in the frequency domain by computing covariance matrices from the broadband acoustic signals for each of a plurality of frequency bins within the frequency range, and
      compute eigenvalues of the covariance matrices; and
   determine a depth along a wellbore of an acoustic source based on ratios of the eigenvalues computed for the plurality of frequency bins and the plurality of depths.

15. The machine-readable medium of claim 14, wherein the ratios of eigenvalues are condition numbers.

16. The machine-readable medium of claim 14, wherein the ratios of eigenvalues are eigenratios.

17. The machine-readable medium of claim 14, wherein the instructions are configured to control the operation of the one or more processors to Fourier-transform the acquired broadband acoustic signals, the covariance matrices being computed from signal values of the Fourier-transformed signals in the plurality of frequency bins.

* * * * *